United States Patent
Borohovski et al.

(10) Patent No.: US 9,742,791 B2
(45) Date of Patent: *Aug. 22, 2017

(54) SITE INDEPENDENT METHODS FOR DERIVING CONTEXTUALLY TAILORED SECURITY VULNERABILITY CORRECTIONS FOR HARDENING SOLUTION STACKS

(71) Applicant: Tinfoil Security, Inc., Mountain View, CA (US)

(72) Inventors: Michael Borohovski, Sunnyvale, CA (US); Ainsley K. Braun, Sunnyvale, CA (US); Angel Irizarry, Belmont, CA (US); Benjamin D. Sedat, Mountain View, CA (US)

(73) Assignee: Tinfoil Security, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/485,645

(22) Filed: Sep. 12, 2014

(65) Prior Publication Data

US 2015/0172308 A1 Jun. 18, 2015

Related U.S. Application Data

(63) Continuation-in-part of application No. 14/105,038, filed on Dec. 12, 2013, now Pat. No. 9,305,169.

(60) Provisional application No. 61/738,592, filed on Dec. 18, 2012, provisional application No. 61/760,598, filed on Feb. 4, 2013.

(51) Int. Cl.
*H04L 29/06* (2006.01)
*G06F 17/22* (2006.01)
*G06F 21/57* (2013.01)

(52) U.S. Cl.
CPC ...... *H04L 63/1433* (2013.01); *G06F 17/2247* (2013.01); *G06F 21/577* (2013.01); *G06F 2221/033* (2013.01); *G06F 2221/034* (2013.01)

(58) Field of Classification Search
CPC ............ H04L 63/1433; G06F 17/2247; G06F 21/577; G06F 2221/033; G06F 2221/034
See application file for complete search history.

(56) References Cited

U.S. PATENT DOCUMENTS

| | | | |
|---|---|---|---|
| 6,996,845 B1 * | 2/2006 | Hurst | G06F 21/577 726/22 |
| 7,975,296 B2 * | 7/2011 | Apfelbaum | G06F 21/577 726/22 |
| 2010/0036832 A1 * | 2/2010 | Griffith | G06F 17/30964 707/608 |

* cited by examiner

*Primary Examiner* — Mahfuzur Rahman
*Assistant Examiner* — Narciso Victoria
(74) *Attorney, Agent, or Firm* — Fenwick & West LLP

(57) ABSTRACT

In auditing a target Web site for security exposures, site specific remediation reports are generated to provide instructional data tailored to components of the Web server solution stack as determined by the auditing computer system. Stack and component identification is performed in a site independent manner based on an analysis of Web page data retrieved by the auditing computer system. Informational aspects of the received data are recognized, enabling further identification of component implementation aspects. Based on the informational and implementation aspects, site, solution stack, and component specific security audit tests are executed against the target Web site. Audit identified security exposures are recorded in correspondence with site, solution stack, and component implementation specific remediation instruction data.

30 Claims, 7 Drawing Sheets

US 9,742,791 B2

SITE INDEPENDENT METHODS FOR DERIVING CONTEXTUALLY TAILORED SECURITY VULNERABILITY CORRECTIONS FOR HARDENING SOLUTION STACKS

CLAIM OF PRIORITY

This application is a Continuation-In-Part of U.S. application Ser. No. 14/105,038, filed Dec. 12, 2013, which claims the benefit of U.S. Provisional Application No. 61/738,592, filed Dec. 18, 2012 and U.S. Provisional Application No. 61/760,598, filed Feb. 4, 2013.

RELATED APPLICATION

The present application is related to, now patented, U.S. Pat. No. 9,369,482, filed concurrently and assigned to the assignee of the present application.

BACKGROUND OF THE INVENTION

Field of the Invention

The present invention is generally related to identifying security exposures that may exist within the solution stack utilized in the implementation of an Internet Web site and, in particular, to identifying a contextually relevant set of security vulnerability corrections for an Internet Web site solution stack instance based on an external, or substantially site independent, analysis of site operations.

Description of the Related Art

In general perception, the Internet serves to smoothly interconnect the many different, seemingly discrete sites into an easily navigable network simply referred to as the World Wide Web (Web). While the underlying systems and software do share certain broad architectural features, individual Web sites, however delimited, are constructed utilizing an extremely varied set of technologies, each often with an equally diverse set of specific implementations. In general terms, the collection of technologies utilized in the functional presentation of a given Web site is referred to as the 'solution stack' implementing the site. The solution stack is thus the set of software subsystems, or program components, that interdependently operate to realize the function of the Web site. The underlying computer server system and associated operating system environment may be considered components of a given solution stack, depending on contextual use. Typical components of a solution stack include Web frameworks, programming languages, database management systems, and Web server applications.

Many of the technological variations in solution stack components have arisen directly in response to the rapid and diverse evolution of the features and functions offered by Web sites, compounded by the requirement to do so at scales that run from hundreds to millions of Web page views per day. Alternate and competitive component solutions have been developed for most every level in the solution stacks, no matter how differently the layers may be defined, in response to the diverse business and social requirements to seamlessly host entertainment, shopping, education, and information services, among many others.

Web sites are conventionally hosted on a server computer system that is publicly available through a network connection to the Internet and thus independently accessible by any client computer systems also connected to the Internet. The complexity of the server system can range from that of a single computer server connected directly to the Internet to an infrastructure interconnecting multiple servers that collectively provide for geographic distribution, redundancy, and load-balancing as appropriate to meet the business or otherwise public-facing functional demands of the Web site. These varied functional requirements often affect and can compound the design and operational complexity of the solution stack implementing a Web site. As a practical consequence, most any solution stack is relatively unique in the selection, versioning, and configuration of the software components utilized.

Given the necessity to ensure Web site security, both with respect to retained user information and malicious functional compromise, many Web site operators will require some form of Internet site security audit. Verifying operational security and resilience to tampering is, however, quite difficult. Conventionally, Internet site security audits are performed to identify vulnerabilities in the underlying systems and solution stacks that could be exploited for undesirable purposes. Typical exploits include direct data loss, data corruption, and functional corruption of any of the software components implementing the site. Data loss includes any misappropriation of personal, financial, product, or other business data. Data corruption may range from an actual destruction of stored data to simply a perceived loss of data integrity resulting from a security breach. Any compromise, disabling, or co-opting of the normal operation of a server system or any of the components within a hosted solution stack is a functional corruption of the Web site.

To be effective, security audits conventionally require access to the computer systems and components of the solution stacks of the Web sites being audited. Such audits are quite time consuming, costly, and, perhaps most significantly, highly intrusive in that the auditors will have to enumerate and review all of the components utilized in the logical construction of the systems and solution stacks being audited. Conventional audits performed without full access are limited to generalized evaluations and, accordingly, unable to provide any detailed recommendations for hardening the audited systems and solution stacks.

Consequently, a need exists for a more efficient and effective system and methods of conducting security audits of Internet Web sites that both identifies vulnerabilities and provides actionable directions for hardening the audited systems specific to the components of the solution stack or stacks actually in use.

SUMMARY OF THE INVENTION

Thus, a general purpose of the present invention is to provide methods of conducting security audits of Internet accessible Web sites that both identifies vulnerabilities and provides actionable directions for hardening the audited systems specific to the components of the solution stack or stacks actually in use.

This is achieved in the present invention by providing an auditing computer system operated to audit target Web sites for security exposures. Site specific remediation reports can be generated to provide instructional data tailored to components of the Web server solution stack as determined by the auditing computer system.

Stack and component identification is performed in a site independent manner based on an analysis of Web page data retrieved by the auditing computer system. Informational aspects of the received data are recognized individually and by various patterns evident in the received data, enabling further identification of component implementation aspects, such as revision levels. Based on the informational and implementation aspects, site, solution stack, and component specific security audit tests are executed against the target Web site. Audit identified security exposures are recorded in correspondence with site, solution stack, and component implementation specific remediation instruction data. This audit data is then available for reporting.

An advantage of the present invention is that specific actionable audit results can be produced by accessing a public-facing Web site. Internal access to the Web site server systems and solution stack components is not required.

Another advantage of the present invention is that a detailed inventory of the solution stack, including identification of specific component versions, can be developed from information accessible from the public-facing Web site. Additional information from a Web site operator can be used as hints and to verify audit identified components, but is not strictly required.

A further advantage of the present invention is that the solution stack inventory can be autonomously generated as an integral part of the audit process of the present invention. The autonomous generation process involves automatic machine parsing, inductive reasoning and expert recognition operations to identify solution stack participating components, including component versions.

Still another advantage of the present invention is that the training and updating of the machine learning systems employed in the present invention can be largely automated to remain current in the ability to identify software components as new versions of the components are introduced.

Yet another advantage of the present invention is that the audit results produced are tailored to the specific software components in the audited solution stack. The tailored results can provide identification of security vulnerabilities, specific to a software component, down to the level of the source code file and lines, and the modification necessary to fix the vulnerability.

Still another advantage of the present invention is that, through automation of the audit process, Web site operators can be provided with access to the audit system to review audit results and, optionally, initiate a repeat audit of a Web site.

DETAILED DESCRIPTION OF THE INVENTION

Figure 1:
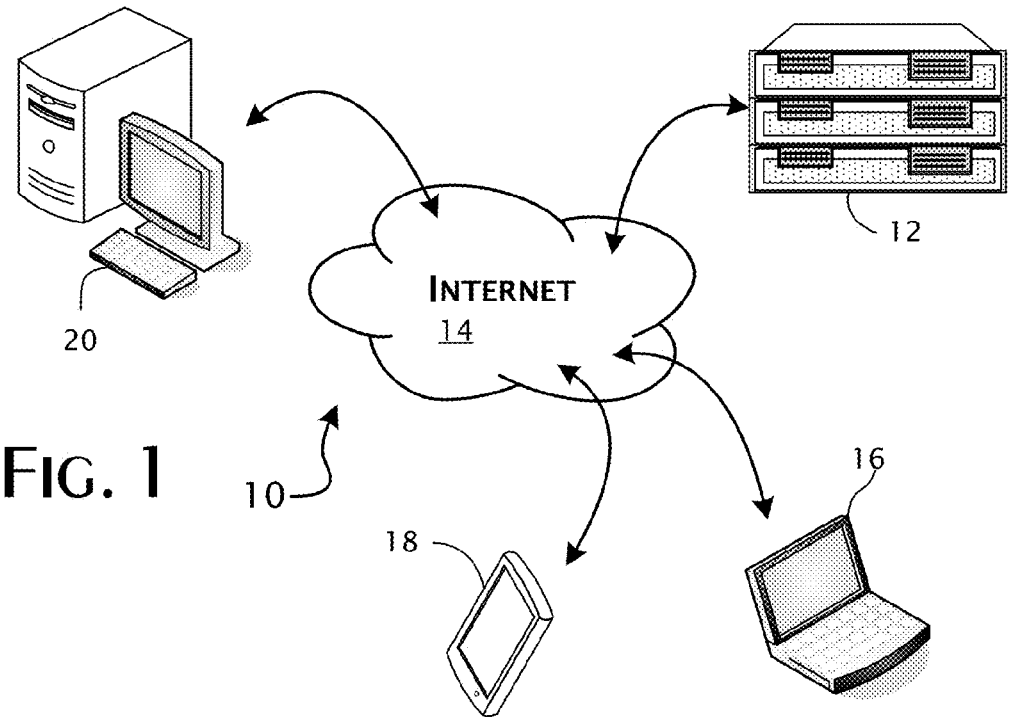
FIG. 1 illustrates a preferred network operating environment for a preferred embodiment of the present invention.

The preferred execution environment for the present invention is generally shown in FIG. 1. A conventional Web server 12 operates to host one or more Web sites that are generally publicly accessible through a network, such as the Internet 14, that allows users to interact with the Web site through various client devices, such as personal and notebook computers 16 as well as tablets, netbooks, and smart phones 18. The Web server 12 may be implemented as a conventional computer server system, a geographically distributed set of computers, or functionally virtualized through hosting on a platform as a service (PaaS) system.

Nominally, the interactive transactions between users and the Web site are secure. However, due to the complexity and nature of the various components and technologies utilized in the creation and operation of the Web site, latent security exposures will exist and, potentially, may be exploited by a knowledgeable user of a client device 16, 18. A computer system 20 implementing the security auditing platform of the present invention, as described in U.S. application Ser. No. 14/105,038, filed Dec. 12, 2013, which is assigned to the assignee of the present application and hereby incorporated by reference, is utilized to audit the Web site for security vulnerabilities and provide a corresponding detailed audit report. Preferably, this computer system 20 is sited as an ordinary client relative to the Web server 12. The basic aspects of the computer system 20 may also be implemented using conventional techniques as a single, distributed, or virtualized computer system. No specific preparation of the Web server 12 is required for auditing purposes, provided the Web server 12 is publicly accessible. Where the Web server 12 is not publicly accessible, such as where implemented as part of an intranet or in the case of a development server, the auditing computer system 20 must be provided with sufficient access rights and privileges to appear as any other intended client computer systems 16, 18 of a restricted Web server 12.

In accordance with the present invention, the computer system 20 implements a security auditing platform that can be operated to target for auditing the Web site hosted by the Web server 12, as well as any number of other, typically distinct Web sites. Such auditing is typically performed at the request of the Web site domain owner, Web site operator, or Web server administrator, individually or collectively referred to as the interested domain entity. Auditing of a particular Web site may be performed on a scheduled or periodic basis, continuously, on-demand by the domain entity, or any combination thereof. The auditing process performed in accordance with the preferred embodiments of the present invention is substantially autonomous and proceeds through a progressive and adaptive scan of the Webpages generated by the Web site server 12. This auditing process is responsive to the content and context of the Web pages received, particularly including dynamically generated Web pages, to enable a thorough exploration of the many different Web pages that may be generated as part of the collective Web site.

Figure 2A:
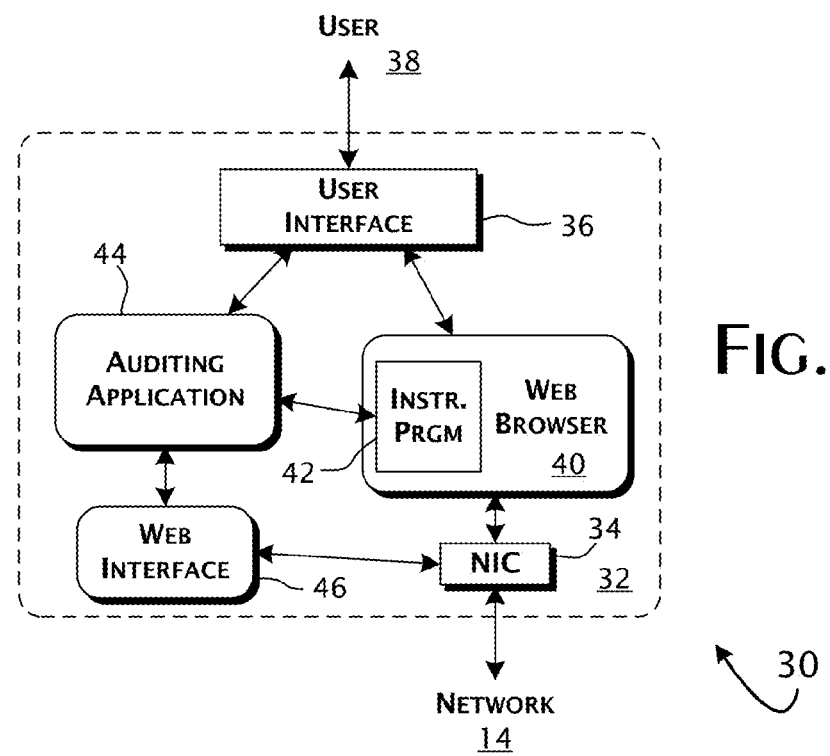
FIG. 2A is a block diagram of an auditing computer system, operative as a client Web browsing system, as constructed in accordance with a preferred embodiment of the present invention.

In the presently preferred embodiments of the present invention, the auditing computer system 20 is implemented as a set of one or more computer systems 30, as generally represented in FIG. 2A. Each computer system 30 is preferably constructed utilizing a conventional server-class computer platform 32 that connects to the network 14 through a network interface controller 34 and supports a local or remote user interface 36 accessible by a user 38, typically an operational administrator of the auditing process. A Web browser application 40 is executed within the processor memory space of the computer platform 32. In accordance with the presently preferred embodiments of the present invention, an instrumentation program 42 is executed within the Web browser 40 as a means to observe and direct internal operations of the Web browser 40. A security auditing application 44 is preferably also executed within the processor memory space of the computer platform 32, either in the form of a conventional application executed by the computer platform 32 or as an application co-executed within the Web browser 40 with the instrumentation program 42. The functions of the security auditing application 44 may also be split, with a portion executing as a separate conventional application and the remainder executing within the Web browser 40. In each instance, the security auditing application 44 communicates with and interoperates through the instrumentation program 42 to direct and manage the auditing process of the present invention. In the presently preferred embodiments of the present invention, the security auditing application 44 executes largely as a separate application within the memory space of the computer platform 32. In addition, the security auditing application 44 preferably implements a Web application interface 46 that enables appropriately secure network access to the management and reporting functions of the security auditing application 44.

Figure 2B:
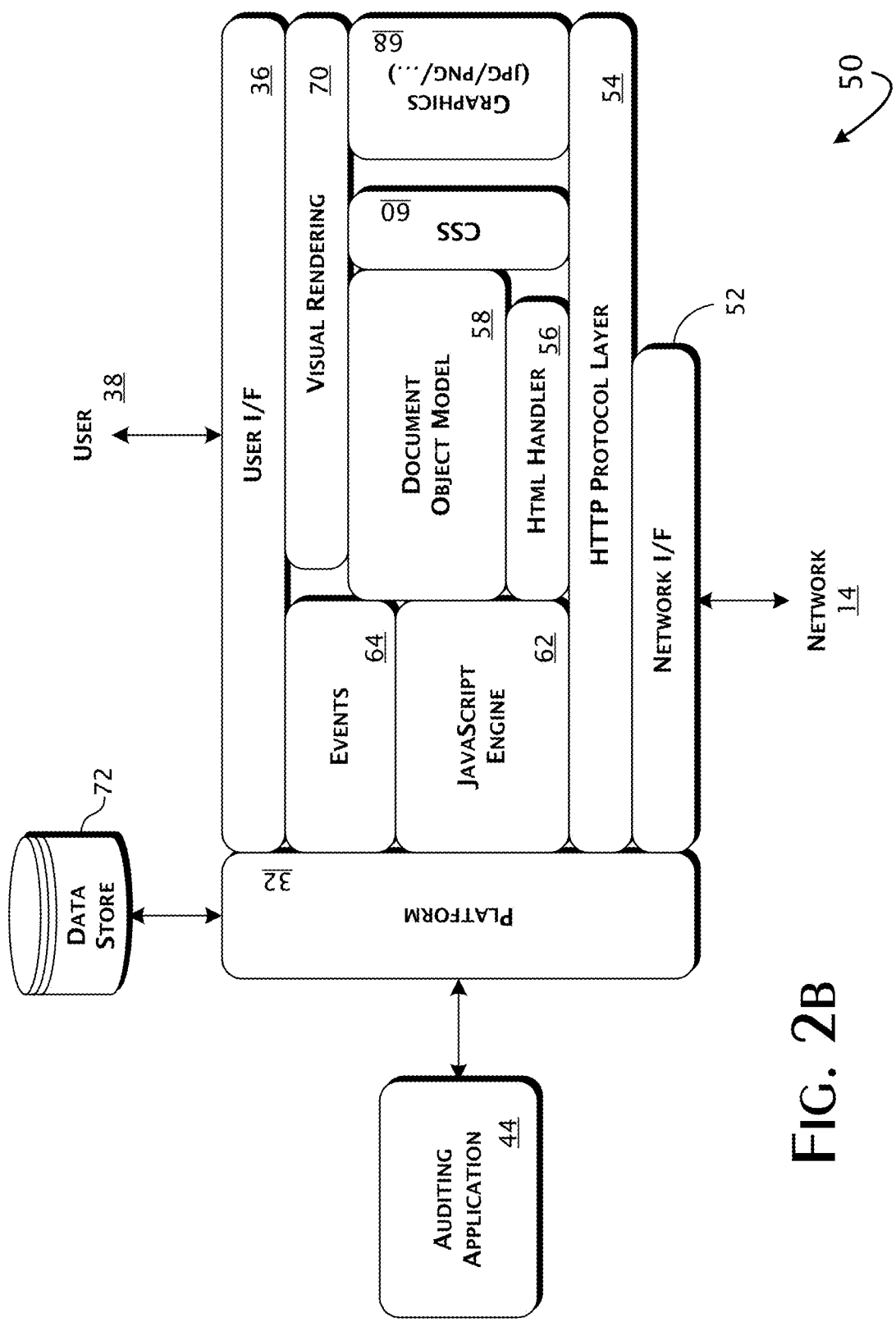
FIG. 2B is a block diagram of a client-based solution stack constructed in accordance with a preferred embodiment of the present invention.

A functional representation of the Web browser application 40, as executed within the processor memory space of the computer platform 32, is provided in FIG. 2B. In the presently preferred embodiments, the Web browser application 40 is preferably constructed largely consistent with conventional client Web browsers, such as Firefox™ (Mozilla Corp.) and Chrome' (Google, Inc.). Alternately, the Web browser application 40 may be realized by a proxy or custom Web client application that functionally implements a client Web browser. In the presently preferred embodiments, the auditing Web browser application 40 is implemented using PhantomJS (phantomjs.org; github.com/ariya/phantomjs) as a dedicated, scriptable, WebKit-based browser. For this presently preferred embodiment, the instrumentation program 42 is implemented in Javascript and executed as an automated browser controller by the Javascript engine 62 as implemented within the PhantomJS browser.

Consistent with the description of the Web browser application 40 above, the functional layers include a network interface layer 52 that enables communication with an external network, such as the Internet 14, and an HTTP protocol stack 54. Documents, typically Web pages, received through the HTTP protocol stack 54 are passed to an HTML handler layer 56. Text-based and binary data, such as JSON and BSON encoded data, may also be appropriately delivered to and initially managed by the HTML handler layer 56. Web page documents and related data are parsed to construct a document object model (DOM), held in a DOM 58. Supplementary documents, such as CSS style sheets, are parsed through a CSS layer 60. The parsed content of the CSS style sheets can be referenced from nodes within the constructed document object model and thereby operate to qualify style properties of corresponding nodes of the document object model.

JavaScript documents, either referenced by or contained within Web pages delivered to the HTML handler layer 56, are preferably loaded by an embedded JavaScript program engine 62 for execution. Preferably, the JavaScript engine 62 is coupled to the document object model 58, enabling programmatic access to and modification of the current document object model under control of the one or more JavaScript programs loaded for execution by the JavaScript engine 62. In addition, the JavaScript engine 62 is coupled to an event manager 64 that enables signaling of event occurrences both with respect to state changes within the document object model and from external sources.

Documents containing well-defined graphics data are processed through a graphics data management layer 68. Graphics data instances are typically referenced by properties of the CSS style sheets, and otherwise from Web pages. As such, nodes within the document object model can be associated by property references with defined graphics instances. A visual rendering layer 70 operates to evaluate the DOM, CSS property data, and graphics instances to construct a visual representation of a current Web page.

The output generated by the visual rendering layer 70 is processed through the user interface layer 36, typically for presentation to the user 38. Also, typically, keystroke and pointer related events from the user 38 are filtered through the user interface layer 36 with relevant events being processed and passed, directly or indirectly, to the event manager 64. Programmatic events and related data originate from or are transferred through the underlying computer platform 32 in response to execution of the platform operating system and application programs, including the security auditing application 44. Other events may be generated in response to the operation of other devices, such as a data storage device 72.

In the preferred embodiments of the present invention, the security auditing application 44 is realized as a program executed by the same or another network connected computer platform 32 external to the Web browser application 40, with communications between the Web browser application 40 and auditing application 44 being facilitated through the network operating system executed by the computer platform 32.

Figure 3:
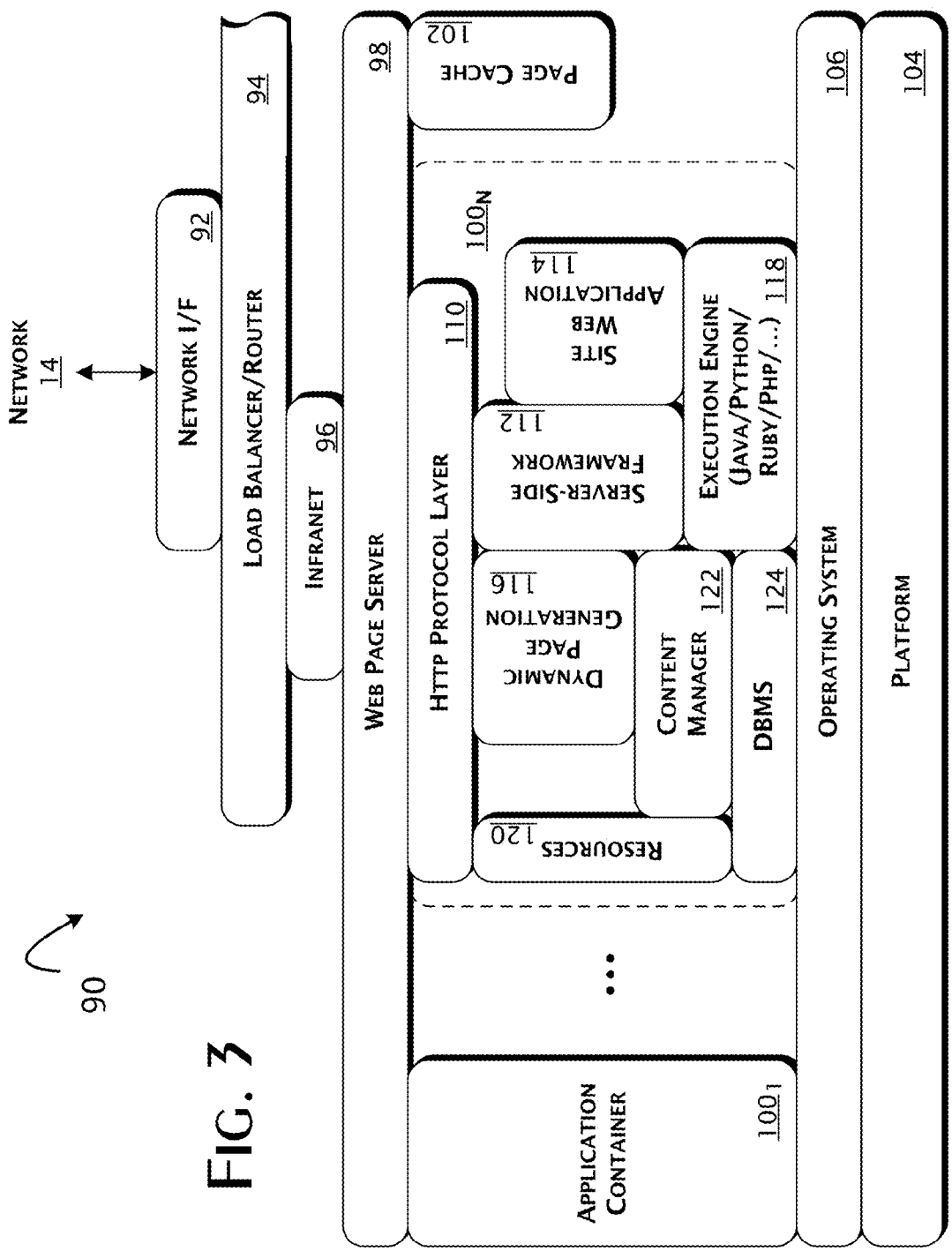
FIG. 3 is a block diagram of an Internet Web server hosting multiple exemplary solution stacks as constructed in accordance with a preferred embodiment of the present invention.

FIG. 3 provides a generalized representation 90 of a Web server 12 as such may be encountered in the operation of the present invention. That is, the specific implementation of any Web server 12 is variable dependent on design decisions made independent of the security auditing platform 32. In general, a Web server 90 may include a network interface 92 that connects directly or indirectly to a publically accessible network 14. This network interface 92 will connect, potentially through load balancers and routers 94 of a local network infrastructure 96 to a Web page server 98 servicing one or more application containers $100_{1-N}$. These application containers $100_{1-N}$ may be implemented utilizing a variety of technologies, ranging from virtualized machines to servlet and other Web containers. A page caching system 102 is typically provided as a service managed by the Web page server 98. The application containers $100_{1-N}$ typically execute within the memory space of a server-class computer platform 104 and supported by a network operating system 106.

The application containers 100$_{1-N}$ may be diverse in specific implementation, though typically the one or more application containers 100$_{1-N}$ allocated for the implementation of a particular Web site will be similar. In general terms, an application container 100$_N$ implements an HTTP protocol layer 110 for servicing Web page and related resource requests. Depending on the specific nature of the Web site implemented, a server-side framework 112 is executed to support the execution of a site Web application 114 and the corresponding dynamic generation of Web pages 116. Framework execution is typically implemented using a Web language-based execution engine 118. Typical language-based engines include Java (Oracle Corp.), PHP (The PHP Group), and Python (Python Software Foundation), among others. Multiple language execution engines 118 may be used in the implementation of a single Web site.

Content access in support of both dynamic page generation 116 and related, typically, static resources 120 is controlled through a content manager 122 conventionally provided as a component or service associated with the server-side framework 112. The content manager 122, in turn, interoperates with a data base management system 124 provisioned within the application container 100$_N$ or accessible through a conventional remote network access interface that communicates through the operating system 106 with a platform 104 accessible data storage resource.

Figure 4:
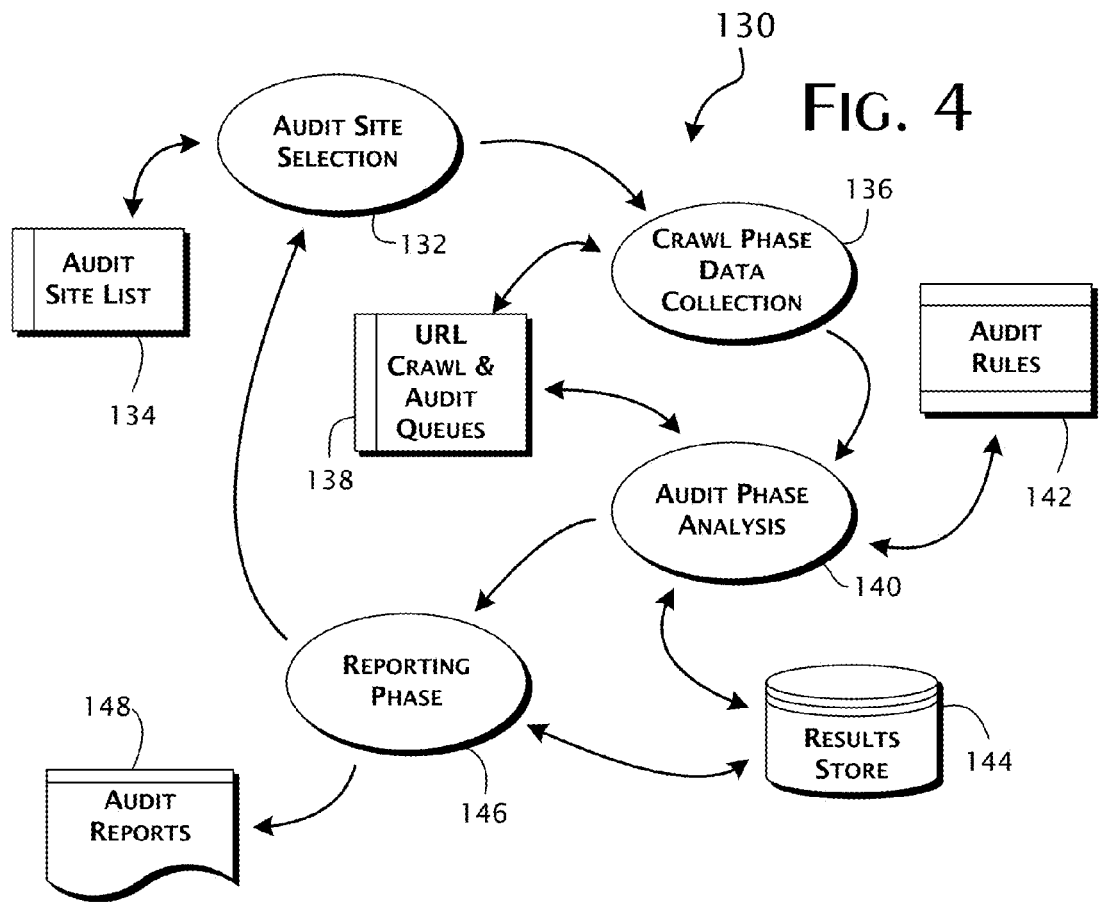
FIG. 4 provides an overview of a process of evaluating a document object model by a Web client as implemented in accordance with a preferred embodiment of the present invention.

The primary security audit process 130, as implemented by a security auditing platform 32 constructed in accordance with a preferred embodiment of the present invention, is shown in FIG. 4. Process execution generally begins with the selection 132 of a target Web site for auditing. Information identifying target Web sites is preferably administratively maintained in an audit site list 134. Selection of any particular target Web site may be qualified by timing or other criteria maintained in or in relation to the information stored by the audit site list 134.

Once a site has been selected 132, a Web site crawling phase 136 begins. By selectively retrieving and parsing pages from the target Web site, a general representation of the overall site can be constructed. In the preferred embodiments of the present invention, this representation is realized as a list of URIs collected into URL crawl and audit queues 138. Preferably, execution of the crawl phase seeks to obtain at least a representative sampling of the Web pages and Web page components, such as forms, links, cookies, headers, and other similar elements, that collectively make up the target Web site. The extent of the sampling may be qualified by various criteria and, in the presently preferred embodiments, by crawl duration and by a limit on the number of URIs collected.

Following the crawling phase 136, an audit phase 140 is executed. The crawl URIs held by the audit queues 138 are used generally as seeding Web site page identifiers. The audit phase 140 execution involves the selective retrieval and parsing of Web pages, discriminating whether a retrieved Web page or Web page component identified from within the Web page corresponds to a Web page or component that has been audited, and processing new Web pages and components through a security audit procedure. A set of audit rules 142 is preferably used to guide the security risk identification and characterization analysis, with the detailed finding produced being persisted to a results store 144. Identifications of the Web page or component audited appropriate for use in discriminating similarities to other possible Web pages and components are preferably stored in the URL crawl and audit queues 138.

Generally following the conclusion of the auditing phase 140 for a given target Web site, a reporting phase 146 is executed. By accessing the information persisted to the results store 144, comprehensive and detailed audit reports 148 can be generated autonomously, according to a preset schedule, or on-demand as desired by the domain entity.

Although the security audit process 130 has been described above as a sequential process, executions of the process 130 relative to different target Web sites may be executed asynchronously and in parallel. In addition, relative to a single target Web site, the various phases 132, 136, 140, 146 may be executed in a parallel pipeline mode to minimize the total real-time required to complete an instance of the security audit process 130.

Figure 5:
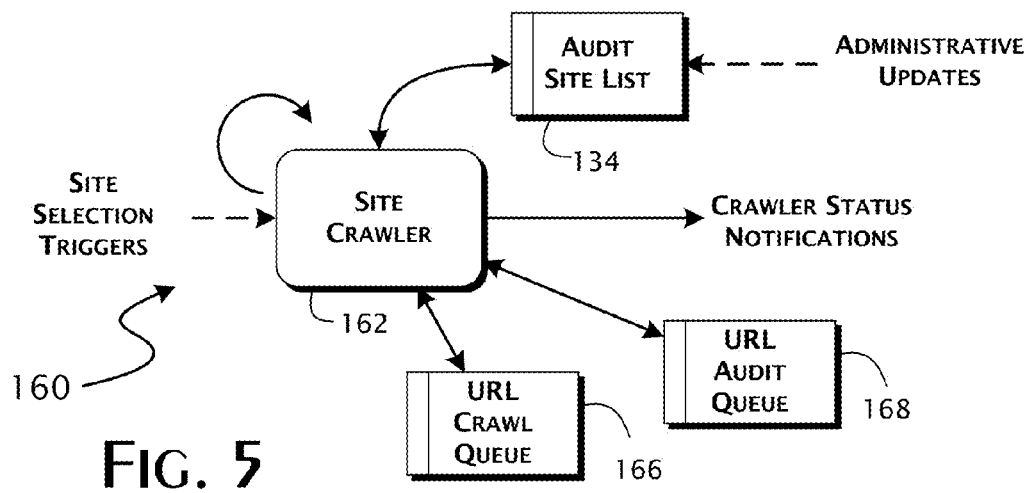
FIG. 5 is a block diagram of a site crawler computer subsystem as implemented in a preferred embodiment of the present invention.

A preferred implementation of a site crawler processor 160 is shown in FIG. 5. The site crawler processor 160 is preferably implemented as part of the security auditing platform 32. A site crawler engine 112 executes initially in response to site selection triggers originated from an execution of the target Web site selection phase 132. A site selection trigger preferably identifies a record instance in the audit site list 134. This audit site record is preferably externally administered to include an initial URI of a target Web site and optionally parameters to be used by the site crawler engine 162. These parameters preferably include a URL crawl queue size and an interval time defining an allowed crawl duration. Other parameters, such as a minimum time between Web page requests, may also be stored as part of the audit site record.

Once initialized, the site crawler engine 162 requests and then parses received Web pages. URLs identified through parsing are added to the URL crawl queue 166. These queued URLs are then drawn down by the site crawler engine 162 and used as the basis for subsequent Web page requests. The initial site selection URL and, preferably, a sub-selection of the URLs parsed from retrieved Web pages are added to a URL audit queue 168. This sub-selection may be based on any of number of fixed and variable criteria. One such fixed criterion may be a maximal depth limit relative to the initial site selection URL. Variable criteria may include domain name aliases that are to be considered as equivalent to the domain specified in the initial site selection URL, a list of URLs to be excluded from the crawl operation, a site specific crawl depth limit, and a factor to be used in the sub-selection of URLs to be added to the URL audit queue 168. These variable criteria, if utilized, are preferably defined administratively and provided as part of the corresponding audit site record. Ongoing progress and a final crawler status notifications are preferably issued by the site crawler engine 162.

Figure 6:
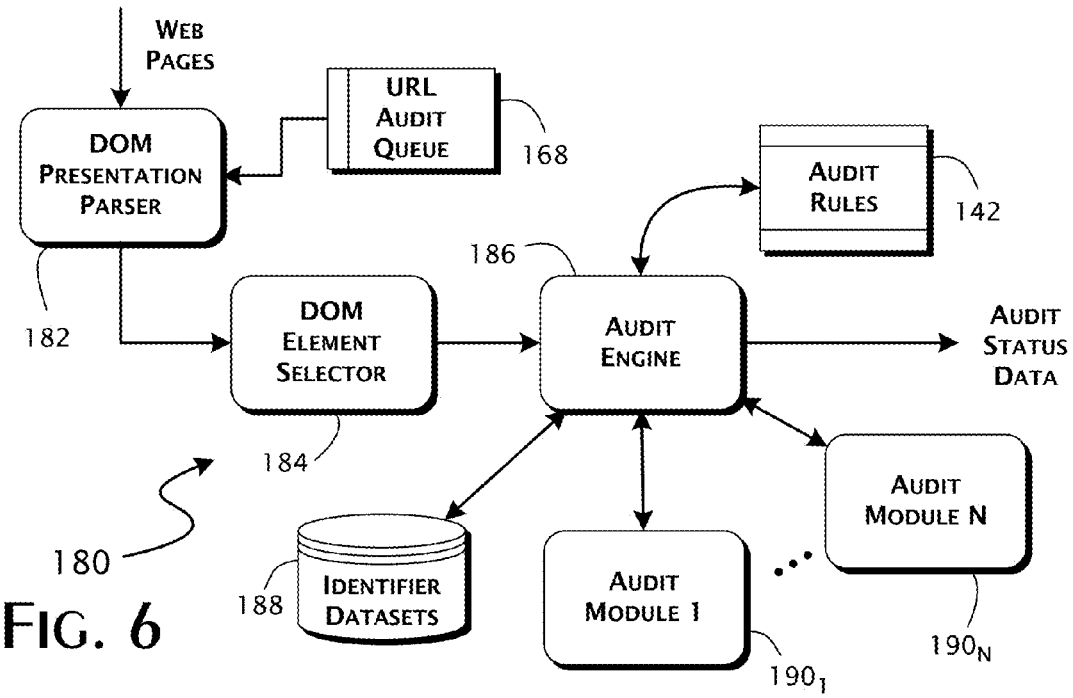
FIG. 6 is a block diagram of an auditing computer subsystem as implemented in a preferred embodiment of the present invention.

A preferred implementation of an audit processor 180, as constructed in accordance with the presently preferred embodiments of the present invention, is shown in FIG. 6. URLs of Web pages previously queued for auditing are retrieved from the URL audit queue 168. To process a dequeued URL, a DOM presentation parser 182 fetches the corresponding Web page and executes to create, as an internal data structure, a DOM representation of the Web page. Resources referenced by the Web page, specifically including the script and style sheet documents are also retrieved.

A DOM element selector 184 then executes to potentially sub-select one or more parts of the DOM data structure for auditing. In accordance with the present invention, aspects of the DOM data structure can be distinguished as representing identifiable Web page components, such as input selectors and data entry forms. Input selectors typically include button-type controls, including push, toggle, and radio-buttons, and check boxes, as well as various implementations of list and tree-based selection controls. Data entry forms typically range from simple text entry and text area fields to semantically complex, structured forms enabling entry of multiple types of user supplied data. These data entry forms often include button and list-type controls that may be variously associated with one or more text entry and text area input fields. Depending on presentation, a form may be divisible into other, more intrinsically identifiable forms or form elements that are separately appropriate for treatment as a well-defined Web element.

Selected Web pages and Web components are advanced by the DOM element selector 184 for further processing by an audit engine 186. Preferably, each Web page and Web component is passed as the corresponding DOM tree or subtree, including associated resources.

To begin the security audit assessment of a Web page or Web page component, the audit engine initially operates to identify aspects of received metadata and DOM data structure that are potentially characteristic of the various software components of a solution stack utilized in the generation and delivery of the underlying Web page.

The metadata will typically contain references, both inferential and explicit, indicative of the source generation and serving of the underlying Web page. Included style and script references are significant individually and in relative combination. Other metadata references, such as those derived from information encoded into the Web page as generated, are preferably used to characterize the nature and content of the Web page. The relative choice and organizational structure of the various elements present in the DOM data structure is also used for characterization.

Names and other identifying terms and values characteristic of particular software components may be discerned, if not directly from these aspects, then by correlations recognizable between the various aspects. For example, header metadata may collectively identify use of a particular Web page generator software component and, thereby, implicate the use of a particular server-side software engine and corresponding server-side framework. The naming scheme of style identifiers and associated classes alone or in combination with the implicit constructive scheme of a Web page or Web page component can be differentially correlated to further discern the identity of the software components of the server-side solution stack.

Independent of the naming scheme, the content of the Web page associated scripts can be evaluated to functionally identity the actual collection of scripts referenced, as well as the particular versions of the scripts employed. That is, by at least a static evaluation, each Web page referenced script can be split into a set of constituent, concatenated scripts. Individual scripts can then be identified by matching against a dataset of known scripts to identify the script and script version. Matching is preferably performed subject to the recognition that scripts may be subject to various forms of compression and obfuscation, as well as to a degree of customization. Identification of specific script versions as well as the collective identification of the scripts significantly informs the identification of the corresponding software components of the server-side solution stack.

In the presently preferred embodiments of the present invention, identifier datasets 188 are maintained by a combination of manual and automated tasks involving the collection and evaluation of samples of Web pages and Web page components having known associations with particular server-side software components. Additionally, script and style libraries typically published as elements of various frameworks are monitored and collected as new versions are released. Various software tools used in the compilation, compression and obfuscation of scripts, styles, and Web pages are also monitored and collected. Through progressive collection and evaluation, including the implicitly established inferential relations between compatible and preferred versioned combinations, the audit engine 186 operates with a high-level of success in identifying the various components involved in the corresponding server-side solution stack.

Although not required, supplementary information may be requested from the Web site domain entity. This request typically asks for an inventory of the software components, including version numbers, employed in the server-side solution stack. The supplementary information received, even if fragmentary and potentially incorrect, is preferably evaluated by the audit engine 186 in combination with the identification dataset 188 to determine the specific identity and version of the software components implemented by a Web site server 12.

Having identified the relevant software components involved in the generation and delivery of a Web page or Web page component, a set of one or more audit modules 190$_{1-N}$ are then selected for the further processing of the Web page or Web page component. In the presently preferred embodiments of the present invention, each audit module 190$_X$ preferably implements a single type or kind of security vulnerability audit. Any of a variety of conventional definitional schemes may be used as a basis for identifying the different kinds of security vulnerability audits to be implemented by the audit modules 190$_X$. In the presently preferred embodiments of the present invention, the implemented security vulnerability audits are generally categorized as input validation tests, access validation tests, configuration tests, and program safety tests. Other test categories may be added as appropriate to identify security vulnerabilities. Audit modules 190$_X$ may be further intentionally constrained within these categories to implementing security vulnerability audits that are specific to a particular framework or language-based server-side software component. This is preferred as allowing a distribution of the security vulnerability audits among the audit module 190$_X$ based on functional similarities in the security vulnerabilities being tested, the functional nature of the software components targeted, and the functional recognition of failures. In the presently preferred embodiments of the present invention, the sets of audit rules 142 are provided to define the conditions that, if satisfied, identify the particular audit modules 190$_{1-N}$ that will further be executed against any particular Web page or Web page component.

For example, considering input validation tests, a subset of the audit modules 190$_{1-N}$ are tailored to evaluate susceptibility to various forms of code injection, header injection, and bulk and patterned data injection. For access validation tests, a typically distinct subset of audit modules 190$_{1-N}$ are tailored to evaluate invalid or weak credential requirements, unprotected access paths, privileged command execution, and command execution errors allowing access to privileged states. For configuration tests, another subset of audit modules 190$_{1-N}$ are tailored to evaluate omissions or errors in system settings that improperly expose program or system information. Another subset of audit modules 190$_{1-N}$ are tailored to evaluate, as program safety tests, the existence of known, unpatched program errors and other deficiencies, loading and other extreme usage patterns resulting in program failures, such as due to race conditions and similar design deficiencies.

Within the defined scope of each audit module $190_{1-N}$, a suite of audit operations are organized for execution by the audit module $190_X$ against the Web page or Web page component of the Web site server 12 being audited. The number and specific nature of the audit operations, or individualized tests, is dependent on the overall audit test operation. As implemented in a presently preferred embodiment, an audit module $190_X$ is equipped with a test suite of input validation audit tests. This test suite, when executed, operates to progressively inject a wide variety of data patterns of varying lengths, typically directly defined or generated by permutation, into a currently selected text entry Web component. Specifically, the selected text entry Web component identifies the corresponding element of the Web site server 12 being audited, which is the actual target of the audit tests. The result of each test is determined preferably by a characterization based analysis of the Web page or other information returned in response to the test invocation. A failure of the component to properly handle the injected data, typically evidenced by a rejection or other well-qualified response, is identified as an audit failure.

Another audit module $190_X$ is preferably equipped, for example, to progressively inject various programmatic statements into a form field or otherwise include the statements in the form as submitted to the Web site server 12. The suite of audit tests implemented preferably inject statements can potentially cause a program fault in a server-side software component, cause corruption of server data, or cause a failure that allows access to server data. Determination of results of a test can be determined again by analysis of the Web page or other information received in response directly or in response to subsequent requests directed to the Web site server 12.

Also by way of example, the presently preferred embodiments employ a separate audit module $190_X$ to evaluate cross-site scripting (XSS) security vulnerabilities. While the XSS test suite is somewhat functionally similar to the code injection test suite, sufficient functional differences are present to prefer implementation by a separate audit module $190_X$. That is, while the XSS test suite also executes to inject program statements into forms or otherwise submit such statements with form data, the detailed implementation of the tests and characterization of the Web site server 12 response significantly are more complex. Specifically, the various tests for XSS exploits involve various approaches to submit data such that operation of the Web site server 12 can, at least in part, be co-opted to enable controlled interaction with another site server. This secondary access is made with the privileges or credentials of the compromised Web site server 12. A sequence of interactions is therefore necessary for a test to properly characterize whether the returned Web pages and other information represents a success or failure.

Figure 7:
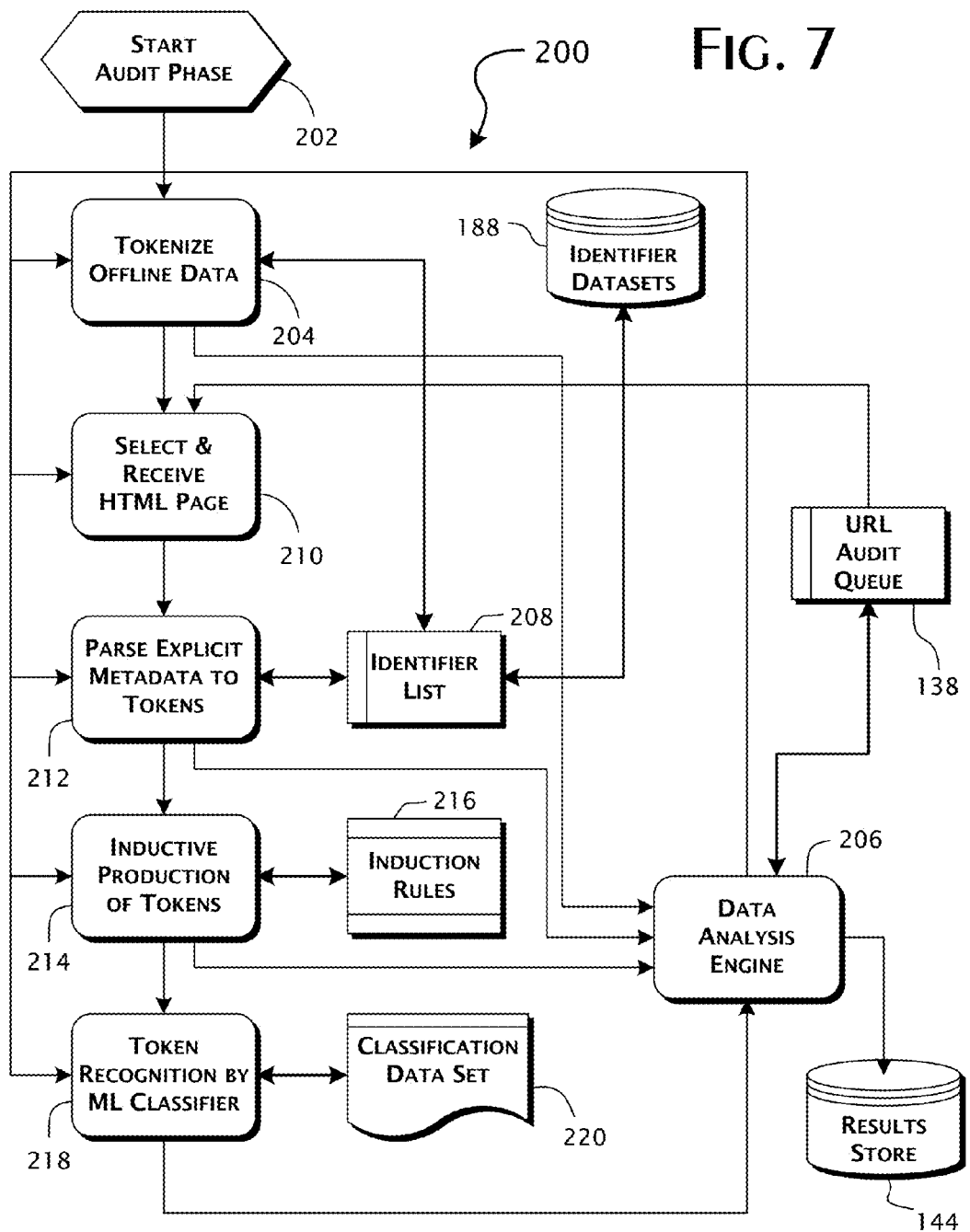
FIG. 7 provides a flow diagram describing an audit operational phase of a process of characterizing a document object model representation of a Web page to identify server solution stack implementing software components as implemented in a preferred embodiment of the present invention.

Execution of the audit phase in accordance with the presently preferred embodiments of the present invention is shown inn FIG. 7. The audit phase execution is typically initiated 202 with the submission of a Web page or Web page component to the audit engine 186. If, with respect to the Web site server 12 being audited, new or updated supplementary information has been received, that information is processed 204 preferably to a collection of tokens representing the various software components. Preferably, each token is identified with a specific software component and includes fields appropriate to discriminate between distribution instances, such as by semantic versioning numbers and source variant identifiers, the latter being significant where multiple forks or branches of a software component may be distributed as alternatives.

Preferably, identification fields allow specification of included ranges and, further, have associated weighting fields, used as confidence factors relative to their corresponding identification fields. Discerning tokens and corresponding field values is supported in the presently preferred embodiments of the present invention by an established matrix of known software components, the various distributed versions and variants, mutual use relations between the components, based on compatibility, best practice deployment, and contemporaneous availability. This matrix also preferably includes, directly or indirectly, values representing the frequency or statistical likelihood of mutual use acquired empirically or derived from conventional market data. The matrix is preferably maintained as a persistent resource stored with the identifier datasets 188.

Tokenization is preferably implemented by an analytic solver implemented within a data analysis engine 206 included within the audit engine 186. In execution, the supplemental information is evaluated to identify software components and generate corresponding tokens. Imprecision in the supplemental information is resolved against the mutual use matrix and, optionally, through use of semantic analysis to reconcile the provided supplementary information against the known mutual use matrix entries. Thus, token specificity will preferably distinguish between vendors of functionally similar components, such as Oracle and Postgres databases. Token specificity will also distinguish between distinct products of known vendors, so that an identification such as "Oracle Analytics Database" is recognized as a reference to an Oracle database product as one software component and a separate Analytics product as another. Multiple terms or other forms of identification may be reconciled as referring to essentially one software component and, therefore, represented by a single token. For example, identifications referencing "Ruby on Rails", "RoR", "Rails" are resolved to a single software component and token. Absent any other identification, a "Ruby" software component is implicitly indicated, resulting in a separate token being generated.

Where a definitive software component identification cannot be analytically resolved, the corresponding weighting fields are adjusted to reflect a corresponding level of confidence. Thus, for example, given a supplemental identification of a solution stack containing "Java", "Apache Tomcat", and "Oracle Analytics Database", the analytic solution would preferably generate the following tokens.

| Token | Component | Weight | Primary Analytic |
|---|---|---|---|
| 1 | Java | 100% | explicit |
|  | Enterprise Edition | 100% | implicit mutual use |
|  | Version 8.x | 5% | Based on empirical |
|  | Version 7.x | 15% | frequency of use and |
|  | Version 6.x | 80% | Tomcat constraint |
|  | Websockets 1.0 | 100% | implicit mutual use |
| 2 | Oracle JDBC Connector | 100% | implicit mutual use |
| 3 | Apache Tomcat | 100% | explicit |
|  | Version 8.0.x | 5% | Not currently released |
|  | Version 7.0.x | 95% | Requires Java version 6.x or later; not certified on Java version 8.x |

-continued

| Token | Component | Weight | Primary Analytic |
|---|---|---|---|
| | Version 6.0.x | 0% | Not websocket enabled |
| 4 | Oracle Database | 100% | explicit |
| | Enterprise Edition | 100% | required for Analytics |
| | Version 10/11/12 | 25/70/5% | frequency of use |
| 5 | Oracle Business Analytics | 100% | explicit |

The use of "Java" in combination with "Apache Tomcat" implicitly requires an Enterprise Edition of Java. Similarly, the Enterprise version of Oracle Database is required by the Oracle Business Analytics product that, in turn, requires at least Websockets 1.0. The combination of Java, Tomcat, and Oracle Database implies use of the Oracle Java JDBC Connector. The combined requirement of Websockets 1.0 and Java restricts the Tomcat component to mutually compatible versions, further weighted based on empirical frequency of use. The available versions of Oracle Database compatible with the Oracle Business Analytics product are also weighted based on frequency of use. These initial tokens are recorded in an identifier list 208 defined relative to the corresponding Web site server 12.

To continue, the data analysis engine 206 directs the retrieval 210 of the Web page or Web page component from the Web site server 12. The retrieved Web page is parsed 212 specifically to recognize aspects of the received Web page relevant to identifying the solution stack software components that generated or otherwise interact with the Web page or Web page component being audited. Based on the recognition of identifying aspects, typified by identifiers embedded in the page metadata, the identifier list 208 of tokens is updated to potentially include additional tokens, to refine the product identifications and versions employed, and, as appropriate, adjust the confidence weights associated with the different token fields.

Optionally, and preferred, an inductive solver may be implemented as an element of the data analysis engine 206 to further discern identifying aspects of the Web page or Web page component being audited. The retrieved and parsed Web page is passed to an inductive analyzer 214 that evaluates the Web page against a set of rules, provided by an induction rule-base 216. These induction rules relate distinguishing feature details of the structure and composition of the Web page to characteristic patterns of generation and interaction produced through the use of particular software components. Where a pattern is differentially identifiable to a particular software component, further differential details of generation and interaction provide can be sufficient to identify a particular variant and version of the software component. Corresponding tokens are either added or updated in the applicable identifier list 208.

Also optionally, a machine learning-based classifier 218 may be implemented to operate under the control of the data analysis engine 206 to provide a deep pattern analysis capability in the identification of software components. Preferably, the classifier 218 operates from a trained classification data set 220 to identify software components based on subtle patterns in the structure and composition of the retrieved and parsed Web page. In general terms, the training captured by the classification data set 220 represents both supervised and unsupervised training against the product of various known combinations of software components as implemented in likewise known solution stacks.

Through the combined operation of the analytic, inductive, and machine learning solvers 212, 214, 218, as may be implemented in a particular instance of a preferred embodiment of the present invention, the data analysis engine 206 is typically able to recognize the distinct, active software components present in the solution stack implemented by a Web site Server 12. To the extent that any software component identification is not certain, a well-defined confidence interval is established for an equally well-defined range of alternate software component variants and versions. The tokens embodying this identification of software components are stored in the results database store 144.

Figure 8:
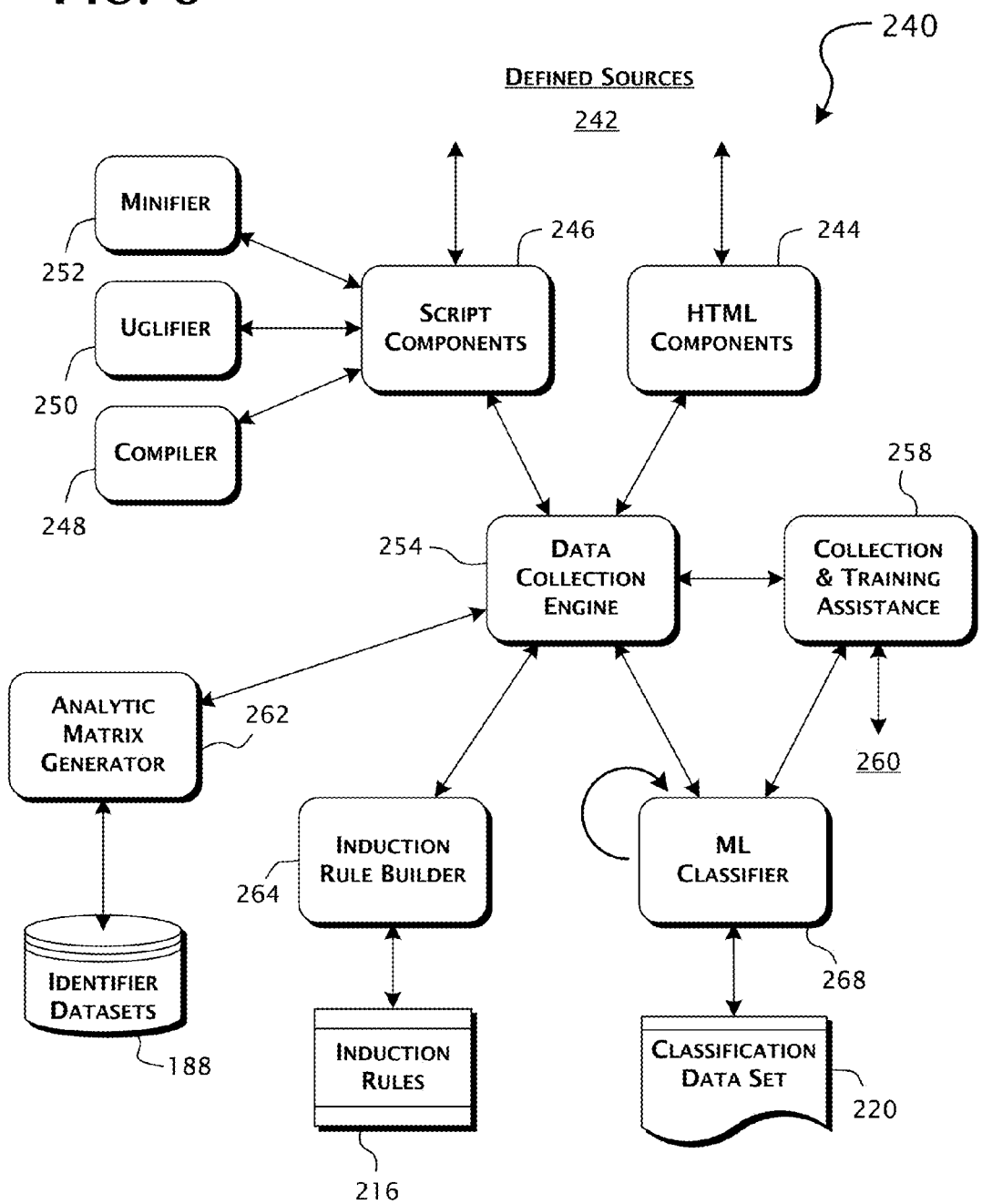
FIG. 8 provides a block diagram illustrating a classification system enabling identification of server solution stack implementing software components as implemented in a preferred embodiment of the present invention.

Referring to FIG. 8, a preferred implementation of a data collection system 240 is shown. The data collection system 240 functions to retrieve and analyze data retrieved from defined sources 242 appropriate for creation and update of the mutual use matrix for the analytic solver, the induction rules for the induction solver, and the classification data set for the machine leaning solver. The source data is acquired from various sources including public repositories accessible through the Internet 14, vendor specific product Web sites, and general product news Web sites, among others. Additional source data is acquired by examining multiple, primarily public though potentially including private Web sites that utilize a wide variety of independently known or discoverable solution stacks. These latter Web sites thus act as exemplary and best-practices references for use in the collection of empirical data.

In operation, the data collection system 240 retrieves primarily HTML Web pages and Web page components 244, and Javascript components 246, the latter including script components that can be reduced or compiled typically to Javascript. A suite of compilers 248 and related tools, such as uglifiers 250 and minifiers 252, are maintained available to realize most of the various instances of the retrieved scripts in the form that may be retrieved from a Web site server 12 being audited for security vulnerabilities. Collection of data is managed by a data collection engine 254 that nominally executes a scheduled examination of the defined data sources 242. Execution can be monitored and adjusted from a collection and training assistance interface 258, typically a local or remote console, that supports interaction with an administrative user 260.

In the normal course of verifying and updating the mutual use matrix, the data collection engine 254 will access, for example, vendor specified system requirements information, including in particular software compatibility requirements relative to the vendor's own products and third-party products that the vendor's products are designed to interoperate with. These requirements are typically specified in terms of vendor, variant, where applicable, and version identifiers. This collected data is provided to an analytic matrix generator 262 to resolve and integrate into the mutual use matrix as stored with the identifier datasets 188.

The Web page and Web page components retrieved by the HTML and script components 244, 246 from the various exemplary Web sites are provided to an induction rule builder 264 for reduction into typically declarative induction rules. The metadata identifiers, as well as the resource names of the style sheets, scripts, and other resources referenced by the retrieved Web page, are extracted to serve as the induction rule objects. The evident vendor, variant and version identifiers are matched to the known identifiers. A historical statistical frequency of mutual occurrence is computed or updated for each associative pairing. The resulting weighted rules are stored as the induction rules in the induction rule-base 216.

The retrieved Web page and Web page components, along with the corresponding known identifiers, are provided to the machine learning classifier 268 as training data. In addition, the as-compiled and reduced script components retrieved from the reference Web site server may also be provided to the classifier 268 as raw data for use in updating the classification data set 220. That is, the vendor typical pre-processing of the script components will be used as a reference training basis. In addition, the different possible variants producible through use of different combinations of the tools 248, 250, 252 are also preferably provided as identified alternate representations of the retrieved script components. In a similar manner, the pre-processed reference and variant forms of the retrieved style sheets may also be supplied to the classifier 268. In this manner, the different variant forms of the script components and style sheet resources will be identifiable from the classification data set 220.

The operation of the machine learning classifier as described above can be considered to be supervised in that relevant identifications of the training data are provided directly to the classifier 268, typically through or as checked by an administrator 260 using the training assistance interface 258. Reliable unsupervised training can be implemented by leveraging the potentially partial identification data that can be obtained from the analytic and inductive solvers based on Web pages and Web page components retrieved from reference sites without having an independent identification of the solution stack software components. To the extent that the analytic and inductive identifications are uncertain, the classification of the training data is correspondingly weighted. Provided the data for unsupervised training is broadly representative of the possible solution stacks, the differential identification of the underlying software components will improve with continued training.

Figure 9:
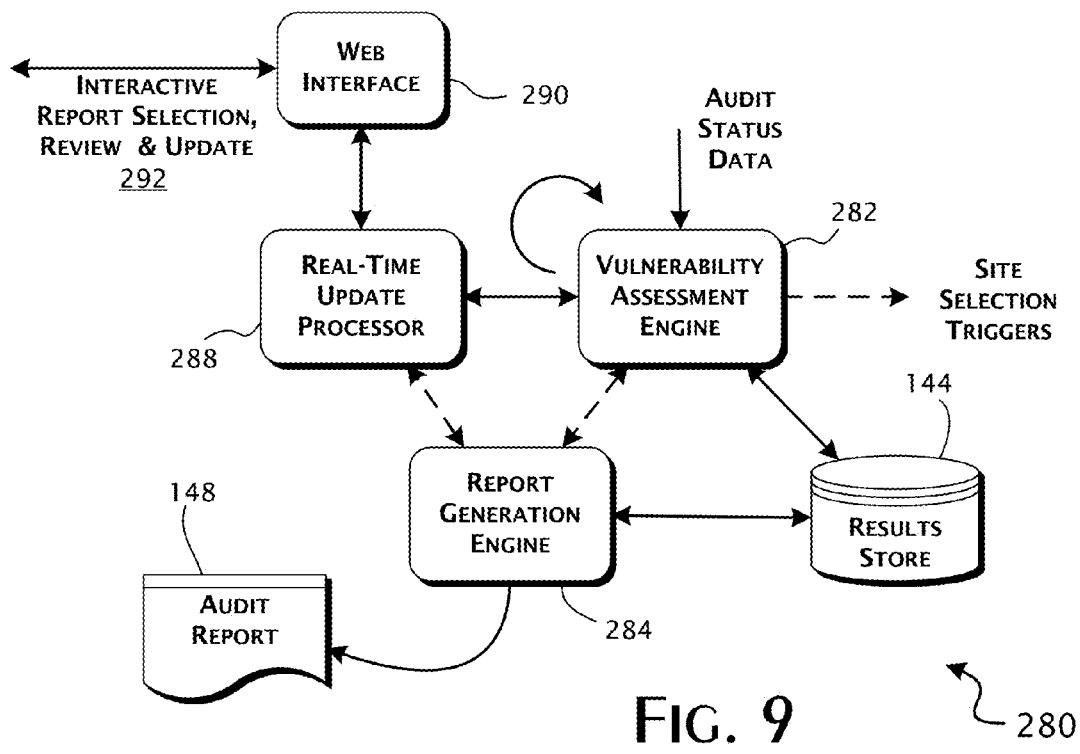
FIG. 9 is a block diagram of a reporting computer subsystem as implemented in a preferred embodiment of the present invention.

A preferred embodiment of a reporting subsystem 280, implementing the reporting phase 146 of a security vulnerability audit, is shown in FIG. 9. Execution by a vulnerability assessment engine 282 proceeds generally in response to the receipt of audit status data generated by the audit engine 186. The audit status data preferably reflects the completion of the security vulnerability audit phase 140 and identifies the completed token-based identifier list 208 stored in the results data store 144 for the audited Web site server 12.

In the preferred embodiments of the present invention, the results data store 144 also includes a database of known security vulnerabilities indexed to the vendor, variant, and version of the known software components. This vulnerabilities database is preferably developed over time based on the various vulnerabilities, exploits, and related issues reported through the collaborative efforts of the security community via Web sites such as Common Vulnerabilities and Exposures (https://cve.mitre.orq; http://www.cvedetails.com), The Open Web Application Security Project (OWASP) (https://www.owasp.org), the Exploit Database (http://www.exploit-db.com), and the National Vulnerability Database (http://nvd.nist.gov), among others. Preferably, newly identified and revised security issues are reviewed and entered into the vulnerability database within the results data store 144. In addition, a software patch with appropriate instructions to remedy the security vulnerability specific to the vendor, variant, and version of the underlying software component is also added to the vulnerability database within the results data store 144. The patch and instructions will further preferably identify the affected file or files by pathnames, and the line numbers within the corresponding files that are affected by the software patch. Supplemental to the included software patch, the particular failing test suite, the failed test within the test suite, and as appropriate the test data that provoked the failure and any collected response data. This supplemental data will have been recorded in the execution of the corresponding audit modules $190_{1-N}$ and attached as supplemental data to the token corresponding to the audit failed software component.

The vulnerability assessment engine 282 preferably executes to evaluate the tokens contained in the identifier list 208 and verify and initially organize correspondences with the vulnerabilities database stored in the results data store 144. Depending on preferences requested or ordered by the Web site domain owner, a report generation engine 284 initiates generation of an audit report 148. In the preferred embodiments of the present invention, the compiled report will contain an identification of each vulnerability found, the Web addresses within the scope of the Web site server 12 of the Web pages affected by the vulnerability, and the data necessary to replicate the vulnerability. The vulnerability will be preferably also identified as belonging to a corresponding vulnerability class and, as applicable, subclasses thereof. These classes and subclasses are defined based on a vulnerability categorization, defined empirically though preferably reflecting consensus categorizations of the security community. In particular, the compiled report preferably contains a description of each relevant vulnerability class and specific instructions explaining how to correct or otherwise remediate the technological implementation underlying the vulnerability class or subclass. As applicable, the software patch and instructions regarding application of the patch will be included. Additional relevant information may be provided, such as related external links to published notices and articles regarding a particular vulnerability or security exposure.

The specific presentation of the description of the vulnerability class and corrective instructions is preferably customized for each reported vulnerability with respect to the actual implementation of the systems and solution stack of the Web site server 12. That is, based on the specific nature of an identified security vulnerability, the explanation and corrective instructions are customized preferably to include, as appropriate, an explanation of the nature and function of the software patch using code samples written in the same language against the same component framework as used in the corresponding software component.

Again, depending on the specific nature of the identified vulnerabilities, the vulnerability assessment engine 282 of preferred embodiments of the present invention may combine two or more remediations for closely related vulnerabilities. In particular, where recommended remedial actions will affect the same or overlapping portions of a file, that is where each potentially a partial remediation for a larger security issue, the software patches may be combined and a single problem description and technical explanation will be provided as part of the compiled audit report 148. This enables the report generation engine 284 to produce an audit report 148 comprehensively tailored to the security vulnerabilities identified while providing the most expedient set of instructions and supporting information for correcting the vulnerabilities.

A real-time update processor 288 either forwards the audit report 148 or generates an appropriate notice, such as by email or text message, that the audit report 148 is available for review by the Web site domain owner or authorized administrators. A secure Web interface 290 is preferably provided to allow the Web site domain owner and authorized administrators to logon to a client-facing audit dashboard 292 hosted by the real-time update processor 288. Preferably, this client-facing audit dashboard provides facilities to review current and previous audit reports 148, to evaluate whether previous identified vulnerabilities are recognized as corrected by application of the necessary software component patches, and to review and confirm the correctness of the automated identification of the vendor, variant, and version of the software components actually used by the Web site server 12. In addition, the client-facing audit dashboard preferably allows entry of supplementary information as appropriate to correct and update the identification of the vendor, variant, and version of any of the software components actually used by the Web site server 12. This supplementary information may be entered prior to execution of any security audit against the Web site server 12 or at any time thereafter to reflect version updates and other changes in the software solution implemented by the Web site server 12.

In a preferred embodiment of the present invention, the client-facing audit dashboard may implement a wizard-style interface suitable for the guided entry of the supplementary information. Natural steps in the wizard progression are preferably defined against the logically related grouping of progressively identified software components. In further preferred embodiment of the present invention, these steps may be informed the automated identification of software components during a prior executed security audit. The wizard steps may also be informed based on the specific contents of the vulnerabilities database stored in the results data store 144. That is, as supplementary information is entered, the level of detail and form of the wizard requested data may be selected to specifically address and differentially identify software components that may be subject to one or another security vulnerability. For example, a choice between two specific variants of a software component, the precise minor version number of two closely interacting software components, or whether another identified patch has been applied may be significant in providing instructions for remediation that are precise.

Typically in response to entry of any additional or updated information, the Web site domain owner can request or directly initiate a new iteration of the Web site security audit. This new execution can proceed as a complete audit or be limited to those aspects of the audit affected by the entry of additional or updated information.

In view of the above description of the preferred embodiments of the present invention, many modifications and variations of the disclosed embodiments will be readily appreciated by those of skill in the art. It is therefore to be understood that, within the scope of the appended claims, the invention may be practiced otherwise than as specifically described above.

The invention claimed is:

1. A method, implemented on a networked computer system, for auditing a target Web site for security exposures and to generate corresponding remediation reports including site specific tailored data to close identified security exposures, the method comprising:
   connecting, by an auditing computer system, through a network to enable communications with a Web server system hosting a target Web site;
   retrieving Web page data from the target Web site, wherein the Web page data includes predetermined informational aspects;
   analyzing the predetermined informational aspects to identify a solution stack of the Web server system, wherein the solution stack includes one or more components, and wherein the analyzing identifies distinct implementation aspects of the one or more components, and wherein the analyzing further includes first evaluating the Web page data to identify metadata and a Document Object Model (DOM) data structure, recognizing the predetermined informational aspects represented by the metadata and DOM data structure, and second evaluating the predetermined informational aspects to identify the solution stack and the corresponding one or more components;
   executing a set of site specific security audit tests with respect to the target Web site, wherein the set of site specific security audit tests are selected from a predefined collection of security audit tests stored by the auditing computer system, wherein selection of the set from the predefined collection is tailored in correspondence with the analysis of the predetermined informational aspects such that execution results of the site specific security audit tests identifies security exposures specific to the target Web site; and
   processing the execution results of the set of site specific security audit tests with respect to the one or more components to derive implementation specific remediation instruction data tailored to the one or more components of the solution stack, wherein the implementation specific remediation instruction data is stored as data records subsequently accessible for reporting the execution results of the site specific security audit tests in conjunction with the implementation specific remediation instruction data.

2. The method of claim 1, wherein the recognizing matches elements of the metadata and DOM data structure against a predetermined identifier dataset to identify the predetermined informational aspects.

3. The method of claim 2, wherein the predetermined identifier dataset includes an analytic matrix relating the predetermined informational aspects to predefined solution stack identities and corresponding component identities.

4. The method of claim 3, wherein the analytic matrix contains entries for the predetermined informational aspects representable in any of multiple forms and as referenced directly and indirectly in the Web page data.

5. The method of claim 1, wherein the recognizing identifies the predetermined informational aspects within the metadata and DOM data structure by inference against a predefined induction rules dataset.

6. The method of claim 5, wherein the predefined induction rules dataset includes one or more rules wherein subsets of the one or more rules correlate to the predetermined informational aspects, thereby establishing inferences as to the solution stack identity and components identities of the target Web site.

7. The method of claim 1, wherein the recognizing identifies the predetermined informational aspects within the metadata and DOM data structure by classification against a predefined classification dataset.

8. The method of claim 1, wherein the site specific security audit tests provide additional predetermined informational aspects.

9. The method of claim 1, wherein the site specific audit tests define Web site interactions tailored to the identities of the solution stack and corresponding components, and wherein the executing executes the set of site specific security audit tests against the target Web site.

10. The method of claim 9, wherein the executing collects audit status data reflecting tested outcomes of the execution of the one or more site specific audit tests.

11. The method of claim 10, wherein the processing includes:

assessing vulnerabilities based on the audit status data; and associating instance elements of the audit status data with predetermined remediation instruction data defined for implemented instances of the solution stack and the corresponding one or more components.

12. The method of claim 11, wherein the processing includes reporting the audit status data, the identified solution stack and the corresponding one or more components, and the predetermined remediation instruction data, whereby the predetermined remediation instruction data is immediately actionable as tailored site specific to the target Web site and the solution stack and corresponding components.

13. The method of claim 12, wherein the reporting is performed in response to a request by an agent of the Web server system for the purpose of retrieving a report of the audit status data, the identified solution stack and the corresponding one or more components, and the predetermined remediation instruction data.

14. The method of claim 13, wherein the reporting includes providing a Web accessible interface through which the agent provides the request.

15. The method of claim 14, wherein the providing allows the agent interactive access through the Web accessible interface to provide additional predetermined informational aspects for use in the analyzing.

16. A non-transitory computer-readable medium comprising instructions that when executed by a processor cause the processor to perform the steps of:

connecting, by an auditing computer system, through a network to enable communications with a Web server system hosting a target Web site;

retrieving Web page data from the target Web site, wherein the Web page data includes predetermined informational aspects;

analyzing the predetermined informational aspects to identify a solution stack of the Web server system, wherein the solution stack includes one or more components, and wherein the analyzing identifies distinct implementation aspects of the one or more components, and wherein the analyzing further includes first evaluating the Web page data to identify metadata and a Document Object Model (DOM) data structure, recognizing the predetermined informational aspects represented by the metadata and DOM data structure, and second evaluating the predetermined informational aspects to identify the solution stack and the corresponding one or more components;

executing a set of site specific security audit tests with respect to the target Web site, wherein the set of site specific security audit tests are selected from a predefined collection of security audit tests stored by the auditing computer system, wherein selection of the set from the predefined collection is tailored in correspondence with the analysis of the predetermined informational aspects such that execution results of the site specific security audit tests identifies security exposures specific to the target Web site; and processing the execution results of the set of site specific security audit tests with respect to the one or more components to derive implementation specific remediation instruction data tailored to the one or more components of the solution stack, wherein the implementation specific remediation instruction data is stored as data records subsequently accessible for reporting the execution results of the site specific security audit tests in conjunction with the implementation specific remediation instruction data.

17. The non-transitory computer-readable medium of claim 16, wherein the recognizing matches elements of the metadata and DOM data structure against a predetermined identifier dataset to identify the predetermined informational aspects.

18. The non-transitory computer-readable medium of claim 17, wherein the predetermined identifier dataset includes an analytic matrix relating the predetermined informational aspects to predefined solution stack identities and corresponding component identities.

19. The non-transitory computer-readable medium of claim 18, wherein the analytic matrix contains entries for the predetermined informational aspects representable in any of multiple forms and as referenced directly and indirectly in the Web page data.

20. The non-transitory computer-readable medium of claim 16, wherein the recognizing identifies the predetermined informational aspects within the metadata and DOM data structure by inference against a predefined induction rules dataset.

21. The non-transitory computer-readable medium of claim 20, wherein the predefined induction rules dataset includes one or more rules wherein subsets of the one or more rules correlate to the predetermined informational aspects, thereby establishing inferences as to the solution stack identity and components identities of the target Web site.

22. The non-transitory computer-readable medium of claim 16, wherein the recognizing identifies the predetermined informational aspects within the metadata and DOM data structure by classification against a predefined classification dataset.

23. The non-transitory computer-readable medium of claim 16, wherein the site specific security audit tests provide additional the predetermined informational aspects.

24. The non-transitory computer-readable medium of claim 16, wherein the site specific audit tests define Web site interactions tailored to the identities of the solution stack and corresponding the components, and wherein the executing executes the set of site specific security audit tests against the target Web site.

25. The non-transitory computer-readable medium of claim 24, wherein the executing collects audit status data reflecting the tested outcomes of execution of the one or more site specific audit tests.

26. The non-transitory computer-readable medium of claim 25, wherein the processing includes:

assessing vulnerabilities based on the audit status data; and associating instance elements of the audit status data with predetermined remediation instruction data defined for implemented instances of the solution stack and the corresponding one or more components.

27. The non-transitory computer-readable medium of claim 26, wherein the processing includes reporting the audit status data, the identified the solution stack and the corresponding one or more components, and the predetermined remediation instruction data, whereby the predetermined remediation instruction data is immediately actionable as tailored site specific to the target Web site and the solution stack and corresponding the components.

28. The non-transitory computer-readable medium of claim 27, wherein the reporting is performed in response to a request by an agent of the Web server system for the purpose of retrieving a report of the audit status data, the identified the solution stack and corresponding the one or more components, and the predetermined remediation instruction data.

29. The non-transitory computer-readable medium of claim 28, wherein the reporting includes providing a Web accessible interface through which the agent provides the request.

30. The non-transitory computer-readable medium of claim 29, wherein the providing allows the agent interactive access through the Web accessible interface to provide additional the predetermined informational aspects for use in the analyzing.

\* \* \* \* \*

UNITED STATES PATENT AND TRADEMARK OFFICE
CERTIFICATE OF CORRECTION

PATENT NO. : 9,742,791 B2
APPLICATION NO. : 14/485645
DATED : August 22, 2017
INVENTOR(S) : Michael Borohovski et al.

It is certified that error appears in the above-identified patent and that said Letters Patent is hereby corrected as shown below:

Claim 1, Column 17, Line 55: "site specific" to read as -- site-specific --

Claim 1, Column 17, Line 65: between "wherein the" and "solution" insert -- identified --

Claim 1, Column 17, Line 67: between "of the" and "one" insert -- corresponding --

Claim 1, Column 18, Line 1: between "components" and "and" delete ","

Claim 1, Column 18, Line 1: between "and" and "includes" delete "wherein the analyzing further"

Claim 1, Column 18, Line 9: "site specific" to read as -- site-specific --

Claim 1, Column 18, Lines 10 and 11: "site specific" to read as -- site-specific --

Claim 1, Column 18, Lines 16 and 17: "site specific" to read as -- site-specific --

Claim 1, Column 18, Line 19: "site specific" to read as -- site-specific --

Claim 1, Column 18, Line 20: between "to the" and "one" insert -- corresponding --

Claim 1, Column 18, Line 21: "implementation specific" to read as -- implementation -specific --

Claim 1, Column 18, Line 22: between "to the" and "one" insert -- corresponding --

Claim 1, Column 18, Lines 23 and 24: "implementation specific" to read as -- implementation -specific --

Claim 1, Column 18, Line 26: "site specific" to read as -- site-specific --

Signed and Sealed this
Ninth Day of October, 2018

Andrei Iancu
*Director of the United States Patent and Trademark Office*

CERTIFICATE OF CORRECTION (continued)
U.S. Pat. No. 9,742,791 B2

Claim 1, Column 18, Line 27 and 28: "implementation specific" to read as -- implementation-specific --

Claim 3, Column 18, Line 35: between "to" and "predefined" insert -- a --

Claim 3, Column 18, Line 36: "identities" to read as -- identity --

Claim 6, Column 18, Line 49: "inferences as to the solution" to read as -- inferences as to a solution --

Claim 6, Column 18, Line 49: between "and" and "components" insert -- corresponding --

Claim 8, Column 18, Line 55: "site specific" to read as -- site-specific --

Claim 9, Column 18, Line 58: "site specific" to read as -- site-specific --

Claim 9, Column 18, Line 60: between "to the" and "solution stack" insert -- identified --

Claim 9, Column 18, Line 60: between "solution stack and" and "corresponding" insert -- the --

Claim 9, Column 18, Line 60: between "corresponding" and "components" insert -- one or more --

Claim 10, Column 18, Line 64: between "status data reflecting" and "tested outcomes" insert -- the --

Claim 10, Column 18, Line 64: between "outcomes of" and "execution" delete "the"

Claim 10, Column 18, Line 65: "site specific" to read as -- site-specific --

Claim 11, Column 19, Line 5: between "instances of the" and "solution stack" insert -- identified --

Claim 12, Column 19, Line 9: after "solution stack" insert -- , --

Claim 12, Column 19, Line 9: between "solution stack" and "the corresponding one" delete "and"

Claim 12, Column 19, Line 12: "site specific" to read as -- site-specific --

Claim 12, Column 19, Line 13: "Web site and the solution stack and corresponding components" to read as -- Web site, the identified solution stack, and the corresponding one or more components --

Claim 13, Column 19, Line 18: after "solution stack" insert -- , --

Claim 13, Column 19, Line 18: between "solution stack" and "the corresponding one" delete "and"

Claim 14, Column 19, Line 22: "Web accessible" to read as -- Web- accessible --

Claim 15, Column 19, Line 25: "Web accessible" to read as -- Web- accessible --

CERTIFICATE OF CORRECTION (continued)
U.S. Pat. No. 9,742,791 B2

Claim 16, Column 19, Line 39: between "wherein the" and "solution stack" insert -- identified --

Claim 16, Column 19, Line 42: delete "wherein the analyzing further"

Claim 16, Column 19, Lines 50, 51/52, 57, 60 and 67: "site specific" to read as -- site-specific --

Claim 16, Column 19, Line 62, 64/65: "implementation specific" to read as -- implementation-specific --

Claim 16, Column 19, Line 61: between "with respect to the" and "one or more components" insert -- corresponding --

Claim 16, Column 19, Line 63: between "data tailored to the" and "one or more components" insert -- corresponding --

Claim 16, Column 19, Line 64: between "components of the" and "solution stack" insert -- identified --

Claim 16, Column 20, Lines 1 and 2: "implementation specific" to read as -- implementation-specific --

Claim 18, Column 20, Line 11: between "informational aspects to" and "predefined solution" insert -- a --

Claim 18, Column 20, Line 11: "identities" to read as -- identity --

Claim 21, Column 20, Line 27: "the solutions" to read as -- a solution --

Claim 21, Column 20, Line 28: between "and" and "components" insert -- corresponding --

Claim 23, Column 20, Line 36: "site specific" to read as -- site-specific --

Claim 23, Column 20, Line 37: between "additional" and "predetermined" delete "the"

Claim 24, Column 20, Line 39 and 42: "site specific" to read as -- site-specific --

Claim 24, Column 20, Line 40: between "identities of the" and "solution stack" insert -- identified --

Claim 24, Column 20, Line 41: between "stack and" and "corresponding" insert -- the --

Claim 24, Column 20, Line 41: "the" to read as -- one or more --

Claim 25, Column 20, Line 47: "site specific" to read as -- site-specific --

Claim 26, Column 20, Line 54: between "instances of the" and "solution stack" insert -- identified --

Claim 27, Column 20, Line 58: "the identified the solution stack and the corresponding one" to read as -- the identified solution stack, the corresponding one --

Claim 27, Column 20, Line 62: "site specific" to read as -- site-specific --

Claim 27, Column 20, Lines 62 and 63: "Web site and the solution stack and corresponding the components." to read as -- Web site, the identified solution stack and the corresponding one or more components --

Claim 28, Column 21, Line 1: "identified the solution stack and corresponding the one or more components" to read as -- identified solution stack, the corresponding one or more components --

Claim 29, Column 21, Lines 5 and 6: "Web accessible" to read as -- Web-accessible --

Claim 30, Column 21, Line 10: "Web accessible" to read as -- Web-accessible --

Claim 30, Column 21, Line 11: between "additional" and "predetermined" delete "the"